United States Patent [19]

Hale

[11] 4,409,279

[45] Oct. 11, 1983

[54] GLASS SUPPORT ROD FOR USE IN ELECTRON-GUN MOUNT ASSEMBLIES

[75] Inventor: John R. Hale, Lancaster, Pa.

[73] Assignee: RCA Corporation, New York, N.Y.

[21] Appl. No.: 353,436

[22] Filed: Mar. 1, 1982

[51] Int. Cl.[3] .............................................. B32B 23/02

[52] U.S. Cl. .................................... 428/192; 428/426; 428/220

[58] Field of Search ............... 428/401, 364, 397, 192, 428/426, 220

[56] References Cited

U.S. PATENT DOCUMENTS

| | | | |
|---|---|---|---|
| 3,838,306 | 9/1974 | Jenne | 313/409 |
| 3,974,416 | 8/1976 | van der Goot et al. | 313/417 |
| 4,032,811 | 6/1977 | Schwartz et al. | 313/417 |
| 4,288,719 | 9/1981 | Hernqvist | 313/457 |

*Primary Examiner*—Marion McCamish
*Assistant Examiner*—Beverly K. Johnson
*Attorney, Agent, or Firm*—E.M. Whitacre; D. H. Irlbeck; L. Greenspan

[57] ABSTRACT

A glass support rod comprising a generally rectangular glass body with flat ends, at least two opposite edges at each of said ends having radii of at least about 0.375 millimeter (15 mils).

5 Claims, 3 Drawing Figures

GLASS SUPPORT ROD FOR USE IN ELECTRON-GUN MOUNT ASSEMBLIES

BACKGROUND OF THE DISCLOSURE

This invention relates to a novel glass support rod or "bead" as it is referred to in the art. Beads of this character are support components of electron-gun mount assemblies for cathode-ray tubes and other types of vacuum electron tubes.

A cathode-ray tube, such as a color television picture tube, comprises an evacuated envelope having a target and an electron-gun mount assembly supported therein. During the operation of the tube, the mount assembly produces one or more electron beams for selectively scanning the target for its designated purpose. The mount assembly comprises two or more glass support rods or beads from which various electrodes are supported to form a coherent unit as is commonly known in the art.

The beads are prepared by pressing powdered glass and a binder in a mold to produce bodies of a desired shape, and then sintering the bodies to remove the binder from the bodies, to develop strength in the bodies and to seal the pores of the bodies. The bodies are generally rectangular with flat ends and may be any size. One common size is about 48 mm (millimeters) by 11 mm by 4.37 mm thick. The corners are quite sharp, having almost no radius when pressed and up to about 0.1 mm (4 mils) of thermally-induced radius after sintering.

Prior to assembling into mount assemblies, the beads are washed to remove residual binder and mold release compound. Then, if desired, portions of the surface may be metalized or otherwise treated. During this processing, prior beads have a tendency to break or chip at the corners thereof, particularly the corners at the ends of the beads. As many as 20% of the beads in a batch have been rejected for breakage or chipping. Because the beads are electrically insulating, they attract and hold glass and other electrically insulating particles electrostatically, which particles are then difficult to remove. But, since they may later be released and may interfere with the operation of the tube, they must be removed or, better still, never be generated.

SUMMARY OF THE INVENTION

The novel glass support rod or bead is similar in size and shape to prior beads except that at least two opposite edges at each end thereof are pressed with a radius so that, after sintering, the novel bead has corner radii of at least 0.375 mm (15 mils) and preferably more than 0.75 mm (30 mils). With about 0.50 mm radii, the reject rate is below one percent, and with more than about 1.00 mm radii, the reject rate is essentially zero, for various batches of the novel beads.

DETAILED DESCRIPTION OF THE PREFERRED EMBODIMENT

Figure 1:
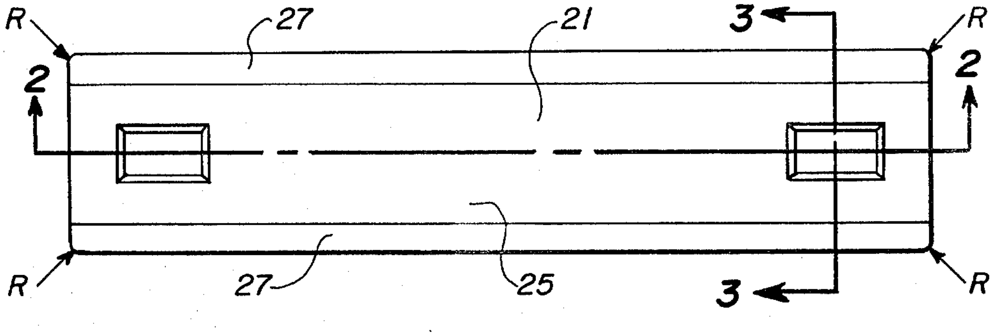
FIG. 1 is a plan view of a preferred embodiment of the novel support rod or bead.
Figure 2:
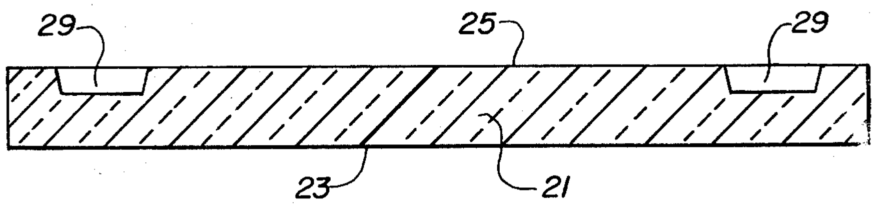
FIG. 2 is a longitudinal sectional view of the preferred embodiment viewed along section line 2—2 of FIG. 1.
Figure 3:
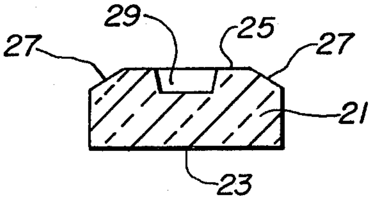
FIG. 3 is a transverse sectional view of the preferred embodiment viewed along section line 3—3 of FIG. 1.

FIGS. 1, 2 and 3 show a novel glass bead 21 which has a generally rectangular shape with flat ends. The bead 21 is about 48 mm long by 11 mm wide by about 4.37 mm thick. The bead 21 is made by the multiform process in which a ground glass frit (in this case composition 7761, Corning Glass Works, Corning, N.Y.) is mixed with a minor amount of organic binder and then pressed to produce a green body having a desired shape. In this green body, the two shortest opposite edges at each end thereof as pressed have radii of about 0.95 mm. Ordinarily, in prior beads, the edges of such green bodies are very sharp and have radii between 0.00 and 0.05 mm.

The green body is then heated at elevated temperatures during which time the binder is removed and the particles of the body sinter together to produce a unitary body which is translucent when viewed in transmitted light. The sintered body or bead 21 is now cooled to room temperature. During the sintering step, the four end edges R are modified to have radii of about 1.00 mm, which is slightly greater than the radii pressed into the green body.

The bead 21 has certain additional features which are not important to the invention although they are important toward using the bead as a supporting structure in an electron-gun mount assembly. During sintering, the body 21 rests with the lower major surface 23 on a refractory surface. As a result, the lower major surface 23 is slightly rough, whereas the other external surfaces are smooth and shiny. The upper major surface 25 has two longitudinal edge bevels 27 and two rectangular depressions 29. These features are for mating with a jig for holding the bead 21 in a subsequent operation. The beveled surface is about 30° from the plane of the upper major surface 25. The depressions are generally rectangular and about 0.180 by 0.110 mm at the bottom.

The bead 21, along with hundreds of other beads, is subjected to considerable handling, including packing, unpacking, washing, drying, inspecting, etc., prior to assembling into a mount assembly. Beads which are excessively chipped or cracked are removed and thrown away, there being no salvage value whatsoever. Studies were made comparing the radii at the four shortest end edges of the beads with the rate of rejection with the following results:

| Radii | Reject Rate |
|---|---|
| Below 0.125 mm | More than 5% |
| 0.125 to 0.375 mm | 2 to 5% |
| 0.375 to 0.625 mm | 0.5 to 2% |
| 0.625 to 0.875 mm | 0.0 to 0.5% |
| Above 0.875 mm | 0.0 |

Clearly, the larger the radii, the lower the reject rate up to about 35 mils, above which the reject rate is essentially zero. Radii of at least 0.375 mm (15 mils) yield a substantial reduction in reject rate. Radii up to about 1.50 mm (60 mils) are practical. Values of about 0.75 to 1.00 mm (30 to 40 mils) are considered optimum.

What is claimed is:

1. For use in an electron-gun mount assembly, a glass support bead comprising a generally rectangular glass body with flat ends, at least two opposite edges at said ends having radii of at least about 0.375 millimeter (15 mils).

2. The support bead defined in claim 1 wherein said radii are about 0.375 to 1.50 millimeters (15 to 60 mils).

3. The support bead defined in claim 1 wherein said radii are more than 0.75 millimeter (30 mils).

4. The support bead defined in claim 1 wherein said radii are about 0.75 to 1.00 millimeter (30 to 40 mils).

5. The support bead defined in claim 1 wherein said body has overall dimensions of about 1.890 millimeters by 0.433 millimeter by 0.172 millimeter.

* * * * *